United States Patent
Garg et al.

(10) Patent No.: US 10,554,476 B2
(45) Date of Patent: Feb. 4, 2020

(54) SYSTEM AND METHOD FOR MANAGING ROLES IN A PEER-TO-PEER CONNECTION

(71) Applicant: Broadcom Corporation, Irvine, CA (US)

(72) Inventors: Neeraj Kumar Garg, Bangalore (IN); Jithu Jance, Bangalore (IN)

(73) Assignee: AVAGAO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 1828 days.

(21) Appl. No.: 13/802,236

(22) Filed: Mar. 13, 2013

(65) Prior Publication Data

US 2014/0025801 A1    Jan. 23, 2014

Related U.S. Application Data

(60) Provisional application No. 61/673,203, filed on Jul. 18, 2012.

(51) Int. Cl.
*G06F 15/16*    (2006.01)
*H04L 12/24*    (2006.01)

(52) U.S. Cl.
CPC .................... *H04L 41/00* (2013.01)

(58) Field of Classification Search
CPC ....... H04W 76/14; H04W 84/20; H04W 4/08; H04L 41/00
USPC .......................................... 709/223
See application file for complete search history.

(56) References Cited

U.S. PATENT DOCUMENTS

| | | | |
|---|---|---|---|
| 2004/0218620 A1* | 11/2004 | Palm ..................... | H04W 74/02 370/445 |
| 2007/0091838 A1* | 4/2007 | Kobayashi ............. | H04L 45/42 370/328 |
| 2007/0249422 A1* | 10/2007 | Podoloff .............. | G06F 3/0219 463/43 |
| 2009/0276537 A1* | 11/2009 | Deverick ............. | H04L 63/061 709/237 |
| 2011/0082905 A1 | 4/2011 | Wentink et al. | |
| 2011/0188391 A1* | 8/2011 | Sella ..................... | H04W 24/10 370/252 |
| 2011/0225305 A1 | 9/2011 | Vedantham et al. | |
| 2011/0274084 A1* | 11/2011 | Chu ..................... | H04W 36/00 370/331 |

(Continued)

FOREIGN PATENT DOCUMENTS

| | | |
|---|---|---|
| CN | 101040241 A | 9/2007 |
| CN | 101218784 A | 7/2008 |
| CN | 101690366 A | 3/2010 |

*Primary Examiner* — Oscar A Louie
*Assistant Examiner* — Oluwatosin M Gidado
(74) *Attorney, Agent, or Firm* — Morgan, Lewis & Bockius LLP (57) ABSTRACT

Systems and methods for managing a peer-to-peer connection are disclosed. A first electronic device discovers a second electronic device available for peer-to-peer connection. A group owner intent value is determined based on one or more power characteristics of the first electronic device. A group owner intent value for the second electronic device is received. The determined group owner intent value is compared with the received group owner intent value for the second electronic device. A group role is assumed based on the comparison of the determined group owner intent value and the received group owner intent value for the second electronic device.

20 Claims, 5 Drawing Sheets

(56) References Cited

U.S. PATENT DOCUMENTS

| | | |
|---|---|---|
| 2012/0106375 A1 | 5/2012 | Woo |
| 2012/0134349 A1 | 5/2012 | Jung et al. |
| 2012/0224569 A1* | 9/2012 | Kubota ................ H04W 84/20 370/338 |
| 2012/0233266 A1* | 9/2012 | Hassan ................... H04W 4/08 709/206 |
| 2012/0320886 A1* | 12/2012 | Anders, Jr. ......... H04W 76/023 370/338 |
| 2013/0148149 A1* | 6/2013 | Park ...................... G06F 3/1296 358/1.13 |
| 2013/0198309 A1* | 8/2013 | Muller ................... G06F 9/526 709/210 |
| 2013/0253880 A1* | 9/2013 | Joseph ............... G01C 19/5776 702/150 |
| 2013/0339504 A1* | 12/2013 | Montemurro ......... H04W 12/06 709/223 |

\* cited by examiner

SYSTEM AND METHOD FOR MANAGING ROLES IN A PEER-TO-PEER CONNECTION

CROSS-REFERENCE TO RELATED APPLICATIONS

The present application claims the benefit of U.S. Provisional Patent Application Ser. No. 61/673,203, entitled "System and Method for Managing Roles in a Peer-To-Peer Connection," filed on Jul. 18, 2012, which is hereby incorporated by reference in its entirety for all purposes.

FIELD

The subject technology generally relates to peer-to-peer connections, and in particular, relates to managing roles in peer-to-peer connections.

BACKGROUND

Certain types of peer-to-peer connections allow a group of electronic devices to connect to each other without a separate wireless access point. In such peer-to-peer connections, one electronic device within the group assumes a group owner role and the remaining devices of the group assume client roles, where the group owner facilitates connecting the group's electronic device to each other.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In accordance with the subject technology, systems and methods for managing peer-to-peer connections are provided. The subject technology runs on electronic devices that support peer-to-peer connections (e.g., Wi-Fi Direct™). According to an aspect of the subject technology, the electronic devices are configured to advertise their presence and discover each other when they are within a proximity of each other. The electronic devices, upon discovery of each other, negotiate roles for the peer-to-peer connection. In one or more implementations, an electronic device can assume a group owner role in the peer-to-peer connection where the group owner is responsible for data transfer between the electronic device and the other electronic device. Alternatively, the electronic device can assume a client role in the peer-to-peer connection. As part of the negotiation process, the electronic devices share respective group owner intent values with each other. Assignment of the group owner role and the client role in the peer-to-peer connection is based on the group owner intent values of the electronic devices. For example, the electronic device with the largest group owner intent value may assume the group owner role.

In one or more implementations, the group owner intent value of the electronic device is determined based on power consumption characteristics of the electronic device. Power consumption characteristics may include an amount of power stored in the electronic device's battery source, a rate of power consumption by the electronic device, and/or whether the electronic device is drawing power from a battery source or connected to a constant power source (e.g., an outlet).

Figure 1:
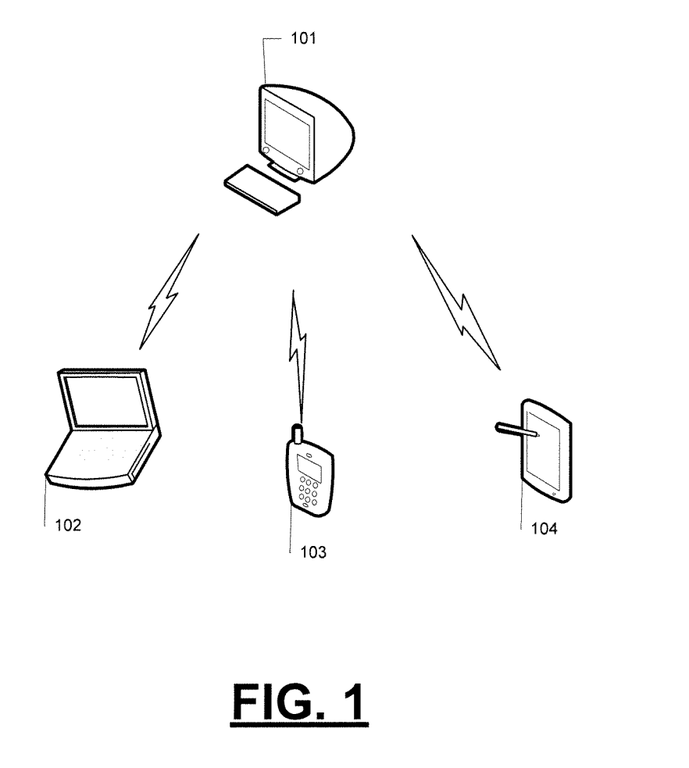
FIG. 1 illustrates an example of electronic devices having peer-to-peer connections.

FIG. 1 illustrates an example of electronic devices having peer-to-peer connections. Electronic devices 101-104 are illustrated in FIG. 1 as a desktop computer, a laptop computer, a smartphone, and a tablet computer, respectively. In one or more implementations, each of electronic devices 101-104 may be any device that supports a peer-to-peer connection, including, but not limited to, a desktop computer, a laptop computer, a tablet computer, a smartphone, a set-up box, a smart television, a server, a switch, a router, a base station, a receiver, a personal digital assistant (PDA), a portable gaming device, and a printer. As illustrated in FIG. 1, electronic devices 101-104 are participants in peer-to-peer connections. In one or more implementations, a different number of electronic devices may participate in the peer-to-peer connections.

The subject technology may be implemented in each of electronic devices 101-104. Each of electronic devices 101-104 may be configured to recognize other electronic devices that are identified as an available participant in a peer-to-peer connection. In one or more implementations, each of electronic devices 101-104 is configured to recognize and establish a peer-to-peer connection with another available electronic device when the other electronic device is detected to be within proximity of the respective electronic device 101-104.

In one or more implementations, electronic device 101 discovers other electronic devices 102-104 to be available for a peer-to-peer connection. After the discovery, electronic devices 101-104 negotiate with each other to determine roles in the peer-to-peer connection. The discovery and negotiation stages may be between pairs of electronic devices. In one or more implementations, electronic devices 101 and 102 may discover each other and negotiate roles for the peer-to-peer connection between them. Electronic devices 103 and 104 may subsequently establish peer-to-peer connections as clients with electronic device 101 as the group owner, bypassing group role negotiations.

During the negotiation stage, each electronic device in the peer-to-peer connection determines its group owner intent value and shares its determined group owner intent value with other electronic devices in the peer-to-peer connection. For example, electronic devices 101 and 102 determine their respective group owner intent value and provide each other with their respective group owner intent value. In one or more implementations, each electronic device compares its group owner intent value with the group owner intent values received from the other electronic devices and roles are assumed based on the comparisons. In one or more implementations, electronic device 101 assumes a group owner role if it has the highest group owner intent value of all the electronic devices.

In one or more implementations, if electronic device 103 is discovered by electronic device 101 after a peer-to-peer connection between electronic device 101 and 102 has been established, electronic device 101 may establish a peer-to-peer connection with electronic device 103 and assume the group owner role in the peer-to-peer connection with electronic device 103. Electronic devices 101-103 may periodically engage in negotiations to establish peer-to-peer connections with each other, during which, electronic devices 101-103 recalculate their respective group owner intent values and possibly assume new roles based on their recalculated group owner intent values. In one or more implementations, if electronic device 103 is discovered by electronic device 101 after the peer-to-peer connection between electronic device 101 and electronic device 102 had been established, each of electronic devices 101-103 calculate their respective group owner intent values and assume roles based on their most recently calculated group owner intent values. In case of a tie, a tie breaker method, such as the tie breaking method specified in the Wi-Fi Direct™ standard, may be used. In one or more implementations, electronic device 101, upon discovery of third electronic device 103, would establish a new peer-to-peer connection with third electronic device 103, and assume a group owner role in the peer-to-peer connection with third electronic device.

Figure 2A:
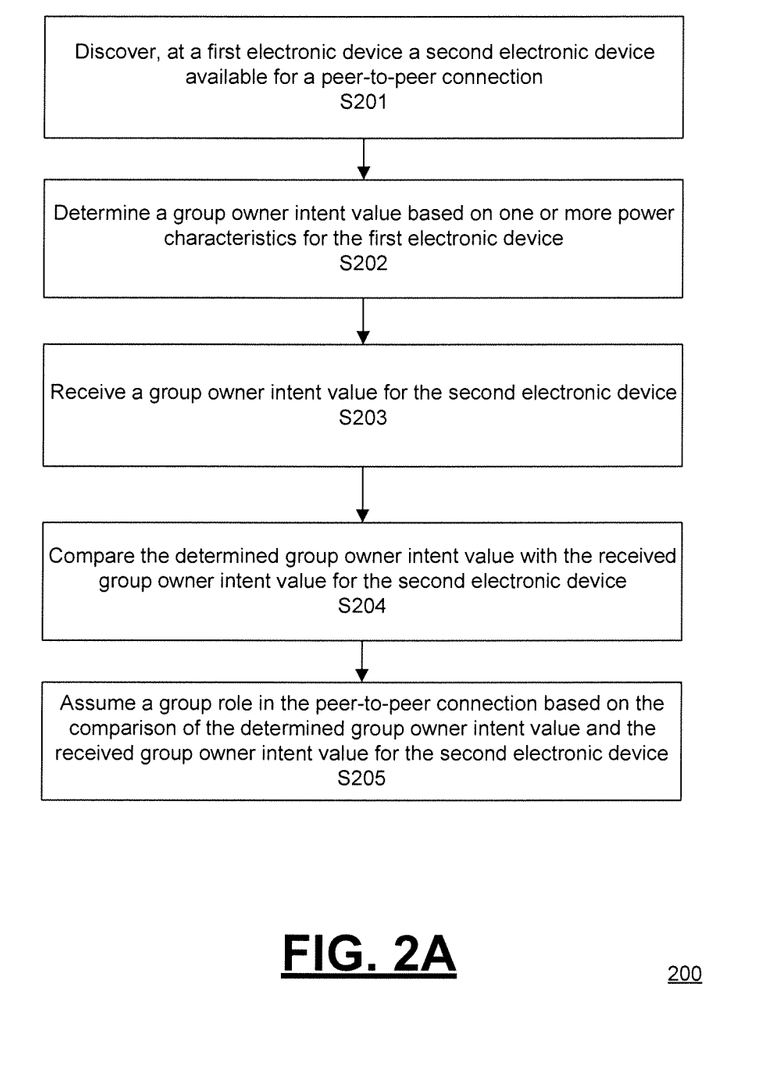
FIG. 2A illustrates an example process for managing peer-to-peer connections in accordance with one or more implementations.

FIG. 2A illustrates an example process for managing peer-to-peer connections in accordance with one or more implementations. The operations in process 200 do not need to be performed in the order shown, certain operations may be performed in different orders or at the same time. In one or more implementations, operations in process 200 may be performed by an application (e.g., a software application, a firmware application) running on the electronic device.

First electronic device 101 discovers second electronic device 102 that is available for a peer-to-peer connection (S201). In one or more implementations, first electronic device 101 is configured to scan for signals broadcasted by second electronic device 102. First electronic device 101 may receive signals broadcasted by second electronic device 102. First electronic device 101, upon receipt of signals broadcasted by second electronic device 102, negotiates with second electronic device 102 to establish the peer-to-peer connection with second electronic device 102. In one or more implementations, first electronic device 101 automatically negotiates with second electronic device 102 to establish the peer-to-peer connection upon receipt of signals from second electronic device 102.

First electronic device 101 determines a group owner intent value based on one or more power characteristics of first electronic device 101 (S202). In one or more implementations, one of the power characteristics is based on whether first electronic device 101 is battery powered or connected to a constant power source (e.g., an outlet). In one or more implementations, increasing the number of operations performed by first electronic device 101 while first electronic device 101 is drawing power from the constant power source has a negligible affect on remaining power supply of the constant power source. In that regard, a maximum group intent value may be selected for first electronic device 101 if first electronic device 101 is connected to a constant power source. In one or more implementations, possible group owner intent values range from 0-10 where 10 is the maximum group owner intent value.

Different types of electronic devices may have different power characteristics. One of the power characteristics may be based on a number of operations that run on first electronic device 101. One of the power characteristics may be based on a number of processor cores in first electronic device 101. First electronic device 101 may monitor usage of its hardware components and calculate the group user intent value based on usage of the hardware components. In one or more implementations, if first electronic device 101 is battery powered and is not in a charging state, then the group owner intent value of first electronic device 101 is based on a number of processor cores that are used by first electronic device 101 at the time the group owner intent value is calculated. In that regard, first electronic device 101 may determine the number of processor cores first electronic device 101 has and/or the number of processor cores used by first electronic device 101, and calculate the group owner intent value of first electronic device 101 based on the total number of processor cores used by first electronic device 101. First electronic device 101 may monitor usage of its processor cores and determine the total number of processors cores used by first electronic device 101. In one or more implementations, first electronic device 101 monitors a total number of operations performed by its processor cores and calculates its group owner intent value based on the total number of operations performed by its processor cores. The group owner intent value of first electronic device 101 may be inversely proportional to the total number of operations that are performed by the processor cores of first electronic device 101.

In one or more implementations, usage of other hardware components (e.g., display interface, network adaptor, RAM, ROM, etc.) on first electronic device 101 are also monitored and the group owner intent value of first electronic device 101 is calculated based on usage of the other hardware components. In one or more implementations, the group user intent value is inversely proportional to the number of hardware components running on first electronic device 101. In one or more implementations, different types hardware components may affect the calculation of the group user intent value differently. In that regard, a hardware component that draws a significant amount of power may have a greater impact on the group user intent value than a hardware component that does not draw a significant amount of power.

In one or more implementations, first electronic device 101 may also determine a total number of applications that are running on first electronic device 101 and calculate the group owner intent value based on the total number of applications that are running on first electronic device 101. In one or more implementations, the group owner intent value of first electronic device 101 varies inversely proportional to the total number of applications that are running on first electronic device 101. In one or more implementations, different types of software applications running on first electronic device 101 may have different impacts on the calculation of group user intent value of first electronic device 101. In that regard, applications that require significant memory (e.g., a gaming application) have a greater impact on the group owner intent value than applications that run on the background (e.g., a screensaver application).

First electronic device 101 receives a group owner intent value for second electronic device 102 (S203). In one or more implementations, second electronic device 102 determines the group owner intent value for second electronic device 102 and provides the determined group owner intent value for second electronic device 101 to first electronic device 101 via the peer-to-peer connection. The process for determining the group owner intent value for second electronic device 102 may be similar or identical to the above described process for determining the group owner intent value for first electronic device 101.

First electronic device 101 compares the determined group owner intent value for first electronic device 101 with the received group owner intent value for second electronic device 102 (S204). First electronic device 101 then assumes a group role in the peer-to-peer connection based on the comparison of the determined group owner intent value for first electronic device 101 and the received group owner intent value for second electronic device 102 (S205). In one or more implementations, first electronic device 101 assumes a client role in the peer-to-peer connection if the group owner intent value for first electronic device 101 is less than the received group owner intent value for second electronic device 102. However, if the determined group owner intent value for first electronic device 101 is greater than the received group owner intent value for second electronic device 102, then first electronic device 101 assumes an owner role in the peer-to-peer connection. In a case where the received group owner intent value for second electronic device 102 is equal to the determined group owner intent value for first electronic device 101, a tie-breaker algorithm (e.g., an algorithm specified in the Wi-Fi Direct™ standard) is used is used to determine the role for first electronic device 101.

In one or more implementations, first electronic device 101 may identify second electronic device 102 as a group client in the peer-to-peer connection if the determined group owner intent value for first electronic device 101 is greater than the received group owner intent value for second electronic device 102. In one or more implementations, first electronic device 101 may identify second electronic device 102 as group owner in the peer-to-peer connection if first electronic device 101 has a group owner intent value that is less than the received group owner intent value for second electronic device 102.

Once a peer-to-peer connection is established between first electronic device 101 and second electronic device 102, the group owner of the peer-to-peer group facilitates maintaining connections between the respective devices. In one or more implementations, if first electronic device 101 assumes the owner role and second electronic device 102 assumes the group client role, data stored on second electronic device 102 may be transmitted to first electronic device 101 where it is processed by first electronic device 101 and transmitted back to second electronic device 102.

In one or more implementations, the group owner of the peer-to-peer connection also assumes responsibility for communicating with other electronic devices that are not in the peer-to-peer connection. In one or more implementations, if first electronic device 101 assumes the owner role, and second electronic device 102 assumes the client role, a request to access a web application running on second electronic device 102 may be transmitted to first electronic device 101 together with user access credentials to access the web application. First electronic device 101, upon receipt of the request to access the web application, communicates with an access point (e.g., server), establishes a connection with a server that hosts the web application, accesses the server for data requested by the first application, downloads the requested data, and transfers the downloaded data to second electronic device 102. In this scenario, operations performed by second electronic device 102 consume significantly less power than operations performed by first electronic device 101.

A group owner may establish multiple peer-to-peer connections with different electronic devices. In the implementation of FIG. 1, electronic device 101 is connected to three electronic devices are connected via three peer-to-peer connections. In one or more implementations, if third electronic device 103 is discovered by first electronic device 101 after a peer-to-peer connection between first electronic device 101 and second electronic device 102 has been established, then third electronic device 103 provides first electronic device 101 with a group owner intent value for third electronic device 103. First electronic device 101 establishes a second peer-to-peer connection with third electronic device 103 and assumes a group owner role in the second peer-to-peer connection if the group owner intent value for third electronic device 103 is lower than the group owner intent value for first electronic device 101. Alternatively, if the group owner intent value for third electronic device 103 is higher than the group owner intent value for first electronic device 101, then the first peer-to-peer connection between first electronic device 101 and second electronic device 102 is severed, and third electronic device 103 establishes new peer-to-peer connections with first electronic device 101 and second electronic device 102, where third electronic device 103 assumes a group owner role in the newly established peer-to-peer connections.

In one or more implementations, if third electronic device 103 is discovered, third electronic device 103 is ignored by first electronic device 101 while the peer-to-peer connection between first electronic device 101 and second electronic device 102 is maintained. In one or more implementations, if first electronic device 101 identifies that third electronic device 103 is within a proximity of first electronic device 101 after first electronic device 101 has established a peer-to-peer connection with second electronic device 102, first electronic device 101 and third electronic device 103 establish a peer-to-peer connection where first electronic device 101 automatically assumes a group owner role in the peer-to-peer connection without considering the group owner intent value for third electronic device 103.

In one or more implementations, a peer-to-peer connection is maintained for a predetermined period of time, after which, the peer-to-peer connection is terminated, group owner intent values for electronic devices in the terminated peer-to-peer connection are recalculated, a new peer-to-peer connection is established between the electronic devices, and the electronic devices renegotiate their roles in a new peer-to-peer connection based on the newly calculated group owner intent values. In one or more implementations, if connections between a group owner and remaining group clients of a peer-to-peer group are severed, a new peer-to-peer connection that includes the remaining group clients are established, group owner intent values for the remaining group clients are determined, and one of the remaining group clients assumes group owner role in the newly established peer-to-peer connection.

Figure 2B:
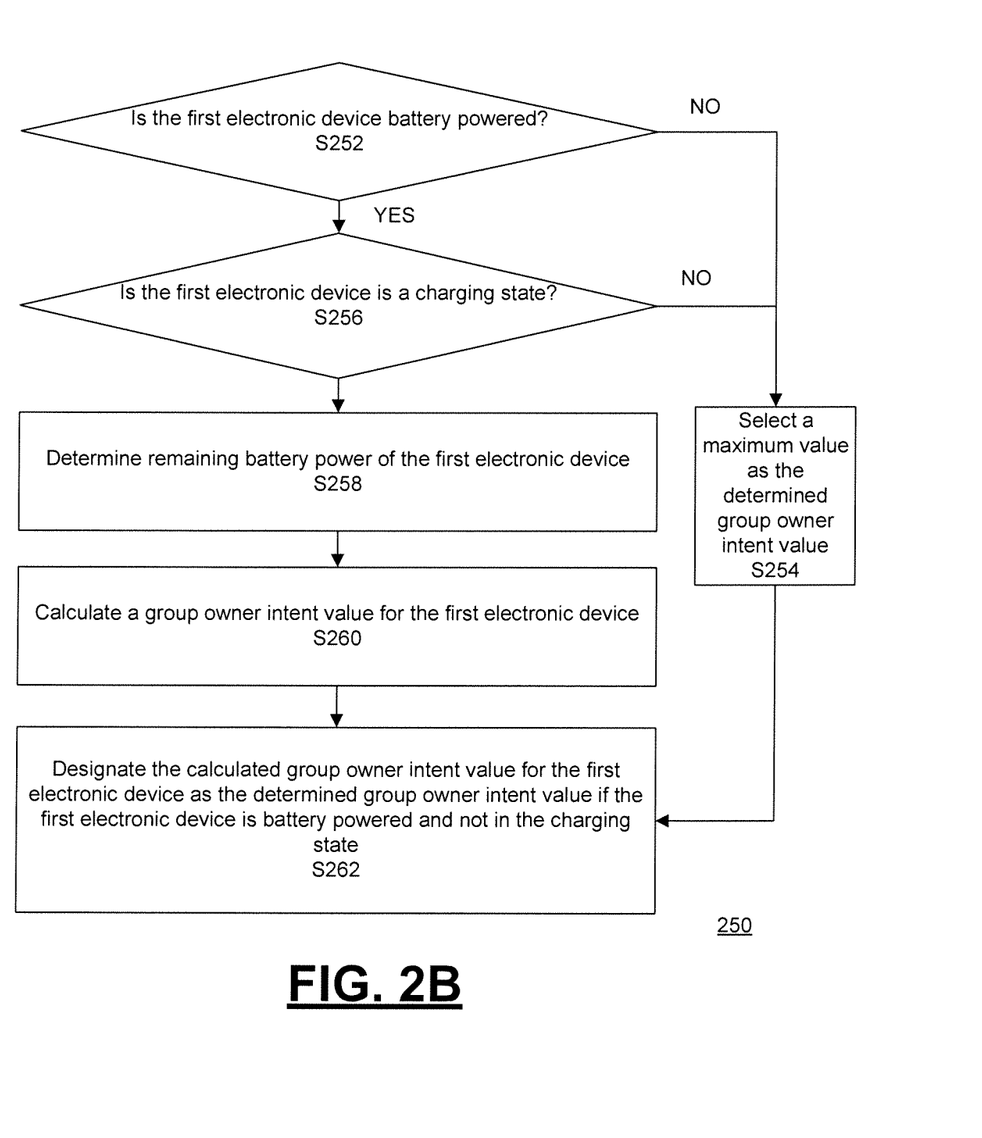
FIG. 2B illustrates an example process for determining a group owner intent value in accordance with one or more implementations.

FIG. 2B illustrates an example process for determining a group owner intent value in accordance with one or more implementations. The operations in process 250 do not need to be performed in the order shown, certain operations may be performed in different orders or at the same time. In one or more implementations, operations in process 250 may be performed by an application (e.g., a software application, a firmware application) running on the electronic device.

First electronic device 101 determines if it is battery powered (S252). If first electronic device 101 is not battery powered (e.g., first electronic device 101 is connected to a constant power source, etc), then first electronic device 101 selects a maximum value as the group owner intent value (S254). The maximum group owner intent value is a top value within a range of possible group owner intent values. If first electronic device 101 is battery powered, then first electronic device 101 determines if it is in a charging state (S256). In one or more implementations, first electronic device 101 is in a charging state if first electronic device 101 is connected to a constant power source (e.g., an outlet). If first electronic device 101 is in a charging state, then first electronic device 101 selects the maximum value as the group owner intent value (S254).

If first electronic device 101 is not battery powered and is not in a charging state, first electronic device 101 obtains its remaining battery power level (S258). In one or more implementations, if first electronic device 101 is connected to a battery source, then a measurement could be made to determine if the power available from the battery source remains constant while first electronic device 101 is in operation. First electronic device 101 then calculates its group owner intent value based on its remaining battery power level (S260). The calculated group owner intent value may be proportional to the remaining battery power level, or may be determined using other algorithms. In one or more implementations, the group owner intent value is based on a number of applications that are running on first electronic device 101. In one or more implementations, the group owner intent value is calculated based on a number of processor cores that are operating in first electronic device 101. In one or more implementations, the group owner intent value is calculated based on the number or operations that are performed by the processors cores in first electronic device 101. First electronic device 101 then designates the calculated group owner intent value for first electronic device 101 as the group owner intent value if first electronic device 101 is battery powered and not in the charging state (S262).

Figure 3:
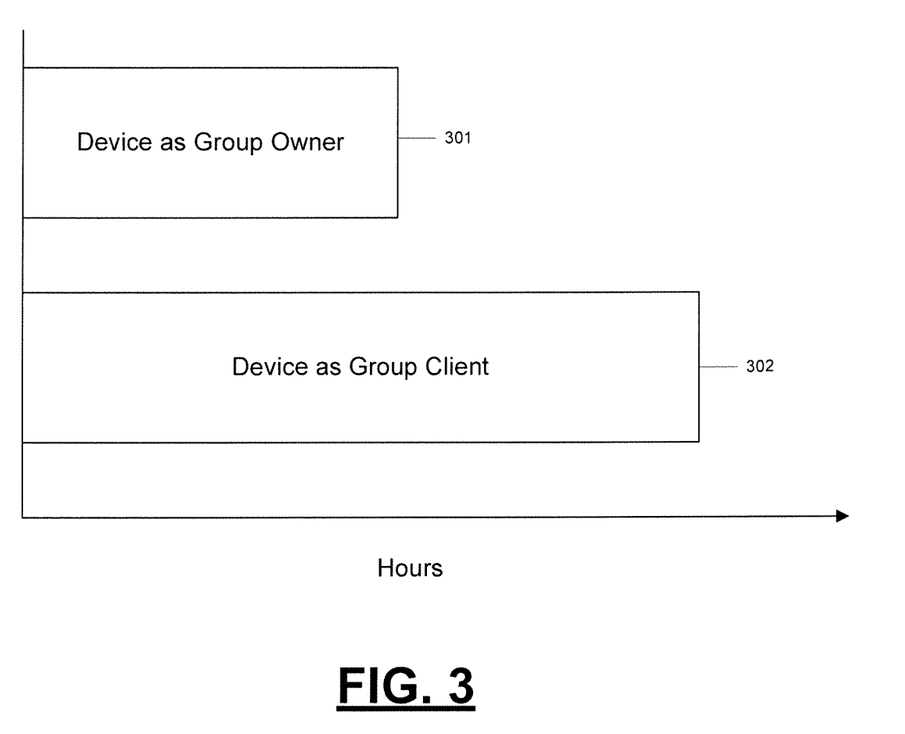
FIG. 3 illustrates a comparison of battery life of an electronic device as the group owner and the battery life of the electronic device as a client in accordance with one or more implementations.

FIG. 3 illustrates a comparison of battery life of an electronic device as the group owner and the battery life of the electronic device as a client. The length of horizontal bars 301 and 302 are proportional to the number of hours an electronic device can operate based on the electronic device's power source. As shown in FIG. 3, horizontal bar 301, which represents hours of operation for an electronic device that is designated as the group owner is much shorter than horizontal bar 302, which represents hours of operation for the same electronic device that is designated as a client but otherwise operation under the same conditions.

Figure 4:
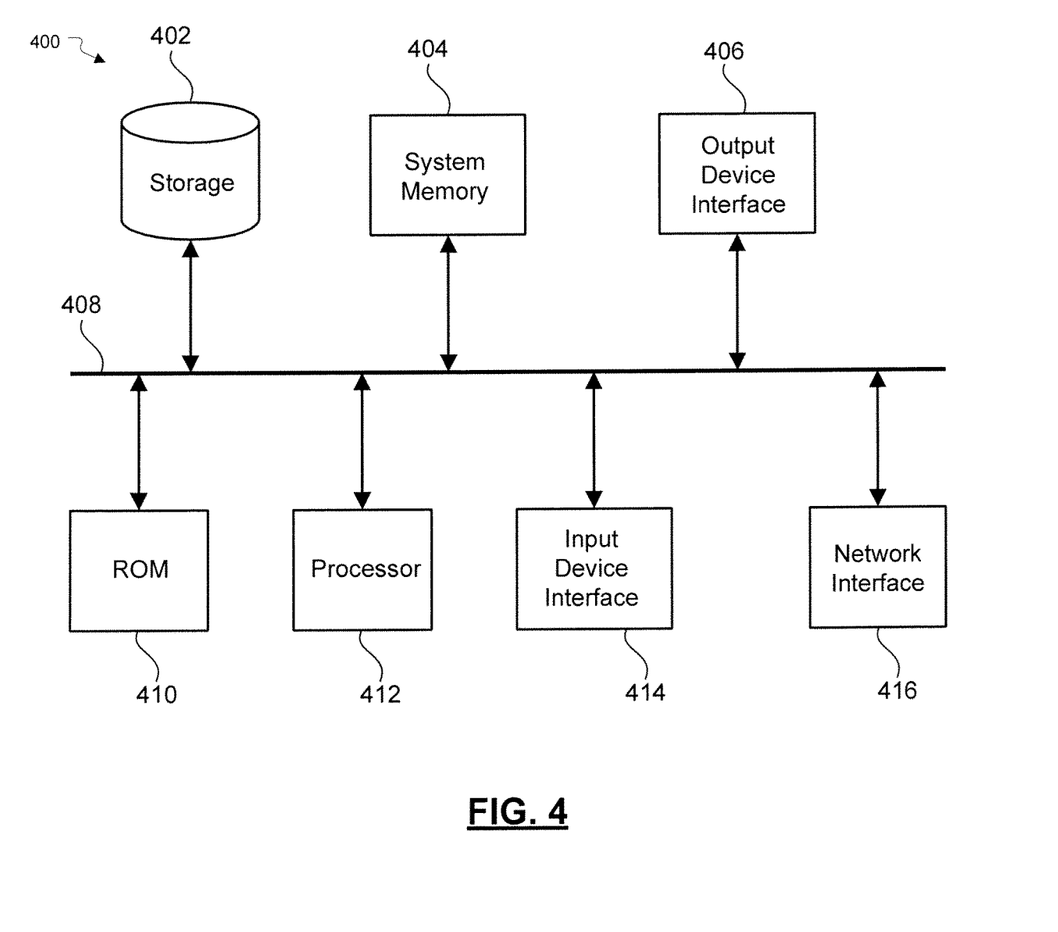
FIG. 4 conceptually illustrates electronic system with which implementations of the subject technology may be implemented.

FIG. 4 conceptually illustrates electronic system 400 with which implementations of the subject technology may be implemented. Electronic system 400, for example, can be a desktop computer, a laptop computer, a tablet computer, a server, a switch, a router, a base station, a receiver, a phone, a personal digital assistant (PDA), any device that can establish a peer-to-peer connection or generally any electronic device that transmits signals over a network. Such an electronic system includes various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    discovering, at a first electronic device, a second electronic device available for a peer-to-peer connection;
    determining, for the first electronic device and prior to assuming a group role in the peer-to-peer connection, a group owner intent value based on an amount of power drawn by a hardware component running on the first electronic device over a given period of time;
    receiving a group owner intent value for the second electronic device;
    comparing the determined group owner intent value with the received group owner intent value for the second electronic device; and
    assuming the group role in the peer-to-peer connection based on the comparing of the determined group owner intent value and the received group owner intent value for the second electronic device.

2. The method of claim 1, wherein the group owner intent value is further based on whether the first electronic device is battery powered.

3. The method of claim 1, wherein the group owner intent value is further based on whether the first electronic device is in a charging state.

4. The method of claim 3, wherein the group owner intent value for the first electronic device is determined to have a maximum group owner intent value if the first electronic device is not battery powered, or if the first electronic device is battery powered and is in the charging state.

5. The method of claim 1, wherein the group owner intent value is further based on a number of operations running on the first electronic device.

6. The method of claim 1, wherein the group owner intent value is further based on a number of processor cores of a multi-core processor of the first electronic device that are in use.

7. The method of claim 1, wherein determining the group owner intent value comprises:
    determining remaining battery power if the first electronic device is battery powered and not in a charging state; and
    calculating the group owner intent value for the first electronic device based on the remaining battery power if the first electronic device is battery powered and not in a charging state.

8. The method of claim 1, wherein a client role is assumed in the peer-to-peer connection if the determined group owner intent value is less than the received group owner intent value for the second electronic device, and
    wherein an owner role in the peer-to-peer connection is assumed if the determined group owner intent value is greater than the received group owner intent value for the second electronic device.

9. The method of claim 8, further comprising:
    applying a tie-breaker algorithm to determine the group role in the peer-to-peer connection if the determined group owner intent value is equal to the group owner intent value for the second electronic device.

10. The method of claim 1, further comprising:
    identifying the second electronic device as a group client in the peer-to-peer connection if the determined group owner intent value is greater than the received group owner intent value for the second electronic device; and
    identifying the second electronic device as a group owner in the peer-to-peer connection if the determined group owner intent value is less than the received group owner intent value for the second electronic device.

11. The method of claim 1, wherein communication between the first electronic device and the second electronic device is based on Wi-Fi Direct.

12. The method of claim 1, wherein the group owner intent value is further based on a number of applications running on the hardware component.

13. A device comprising:
    at least one processor circuit configured to:
        discover, at a first electronic device, a second electronic device available for a peer-to-peer connection;
        determine a group owner intent value based on one or more power characteristics of the first electronic device, the one or more power characteristics comprising a number of processor cores of a multi-core processor of the first electronic device that are in use;
        receive a group owner intent value for the second electronic device;
        compare the determined group owner intent value with the received group owner intent value for the second electronic device;
        assume a client role in the peer-to-peer connection if the determined group owner intent value is less than the received group owner intent value for the second electronic device;

assume an owner role in the peer-to-peer connection if the determined group owner intent value is greater than the received group owner intent value for the second electronic device; and apply a tie-breaker algorithm to determine a group role in the peer-to-peer connection if the determined group owner intent value is equal to the group owner intent value for the second electronic device.

14. The device of claim 13, wherein one of the one or more power characteristics is an indication of whether the first electronic device is battery powered.

15. The device of claim 13, wherein one of the one or more power characteristics is an indication of whether the first electronic device is in a charging state.

16. The device of claim 13, wherein one of the one or more power characteristics is a number of applications that run on the first electronic device.

17. The device of claim 13, wherein one of the one or more power characteristics of the first electronic device is a total number of processor cores in the first electronic device.

18. The device of claim 17, wherein the total number of processor cores is greater than the number of processor cores in use.

19. A computer program product comprising instructions stored in a non-transitory computer-readable storage medium, the instructions comprising:

instructions to discover, at a first electronic device, a second electronic device available for a peer-to-peer connection;

instructions to receive a group owner intent value for the second electronic device;

instructions to select a maximum group owner intent value for a group owner intent value for the first electronic device if the first electronic device is not battery powered;

instructions to determine if the first electronic device is in a charging state when the first electronic device is battery powered;

instructions to select the maximum group owner intent value for the group owner intent value for the first electronic device if the first electronic device is in the charging state;

instructions to determine remaining battery power if the first electronic device is battery powered and not in the charging state;

instructions to calculate a group owner intent value for the first electronic device based on the remaining battery power and a number of applications running on the first electronic device if the first electronic device is battery powered and not in the charging state;

instructions to designate the calculated group owner intent value for the first electronic device as the group owner intent value for the first electronic device if the first electronic device is battery powered and not in the charging state;

instructions to compare the group owner intent value for the first electronic device with the received group owner intent value for the second electronic device; and instructions to assume a group role in the peer-to-peer connection based on the compare of the group owner intent value for the first electronic device and the received group owner intent value for the second electronic device.

20. The computer program product of claim 19, wherein the instructions to calculate the group owner intent value for the first electronic device based on the remaining battery power and the number of applications running on the first electronic device further comprise instructions to calculate, by the first electronic device, the group owner intent value for the first electronic device based on the remaining battery power, the number of applications running on the first electronic device, and an amount of power drawn by a number of processor cores of a multi-core processor of the first electronic device that are in use.

* * * * *